Dec. 26, 1967  M. LECHEVALLIER  3,359,811
DRIVE MECHANISM FOR NUCLEAR REACTOR CONTROL RODS
Filed Nov. 12, 1963  2 Sheets-Sheet 2

INVENTOR.
MAURICE LECHEVALLIER
BY
Bacon & Thomas
ATTORNEYS

United States Patent Office 3,359,811
Patented Dec. 26, 1967

3,359,811
DRIVE MECHANISM FOR NUCLEAR REACTOR
CONTROL RODS
Maurice Lechevallier, Viry-Chatillon, France, assignor to
Groupement Atomique Alsacienne Atlantique, Le
Plessis-Robinson, Hauts-de-Seine, France
Filed Nov. 12, 1963, Ser. No. 322,728
Claims priority, application France, Nov. 12, 1962,
915,120
5 Claims. (Cl. 74—89.2)

The present invention relates to a mechanism which carries out as required the displacements of control rods in a nuclear reactor.

It is known that the control rods of a nuclear reactor consist of a neutron-absorbing material which is surrounded by a sheath or jacket and that said rods are called upon to serve three purposes, namely, fine control of the reactor, coarse control and safety control. The fine-control or so-called "fine" rods permit the possibility of changing the power level of the reaction by modifying the absorption of neutron flux by the material which consistutes the rod, while following a predetermined program. The action of the coarse-control or so-called "shim" rods is superimposed on that of the "fine" rods. Insofar as concerns the so-called "safety" rods, these latter are kept completely out of the reactor under normal operating conditions. Should an emergency arise, or in other words, should the neutron flux emitted in the reactor core increase beyond the design safety limits, the safety rods must accordingly be inserted into the reactor core at great speed in order to permit the neutron level to be restored to a value which no longer presents any danger.

It is also known that it is an advantage for large-scale production purposes to endow control rods with the same geometric configurations and dimensional characteristics such as shape, cross-section, etc. It accordingly follows that the movements of the rods which correspond to the three functions noted above (namely, fine control, coarse control and safety control) must be carried out by means of a single type of drive mechanism for each rod, notwithstanding the differences which exist between these functions. Reference will therefore be made hereinafter to a "universal" drive mechanism since this latter permits any one control rod to carry out as required any of these three functions.

It will furthermore be apparent that such drive mechanisms are subjected within a nuclear reactor to conditions of intensive and difficult operation, in particular to the action of high temperatures. Such mechanisms must therefore necessarily be endowed with a certain number of practical qualities such as small overall size, ruggedness, length of life, ease of disassembly, leak-tightness, and low power consumption.

The drive mechanism for nuclear reactor control rods in accordance with the present invention meets the main requirements mentioned above. Said mechanism is characterized in that it comprises a control-rod suspension member which passes over a guiding device, a first system for locking said suspension member in position and securing the control rod against further movement, said first system being located between said control rod and said guiding device, and a second system for locking said suspension member in position on the other side of said guiding device, the two systems being mounted on a single frame, means for producing and controlling the relative displacement of said guiding device and said frame, the progressive movement of the control rod when the first locking system is released, the return of the guiding device and the frame to the ready position when the second system is released, and the dropping of said control rod when the two systems are released.

A detail description now follows below in reference to one example of embodiment of the mechanism in accordance with the invention which is given without thereby limiting the scope of the invention. The said mechanism is illustrated in the accompanying drawings, wherein:

FIG. 1A is a diagrammatic view similar to FIG. 1, but showing the control rod suspended below the frame.

Figure 1:
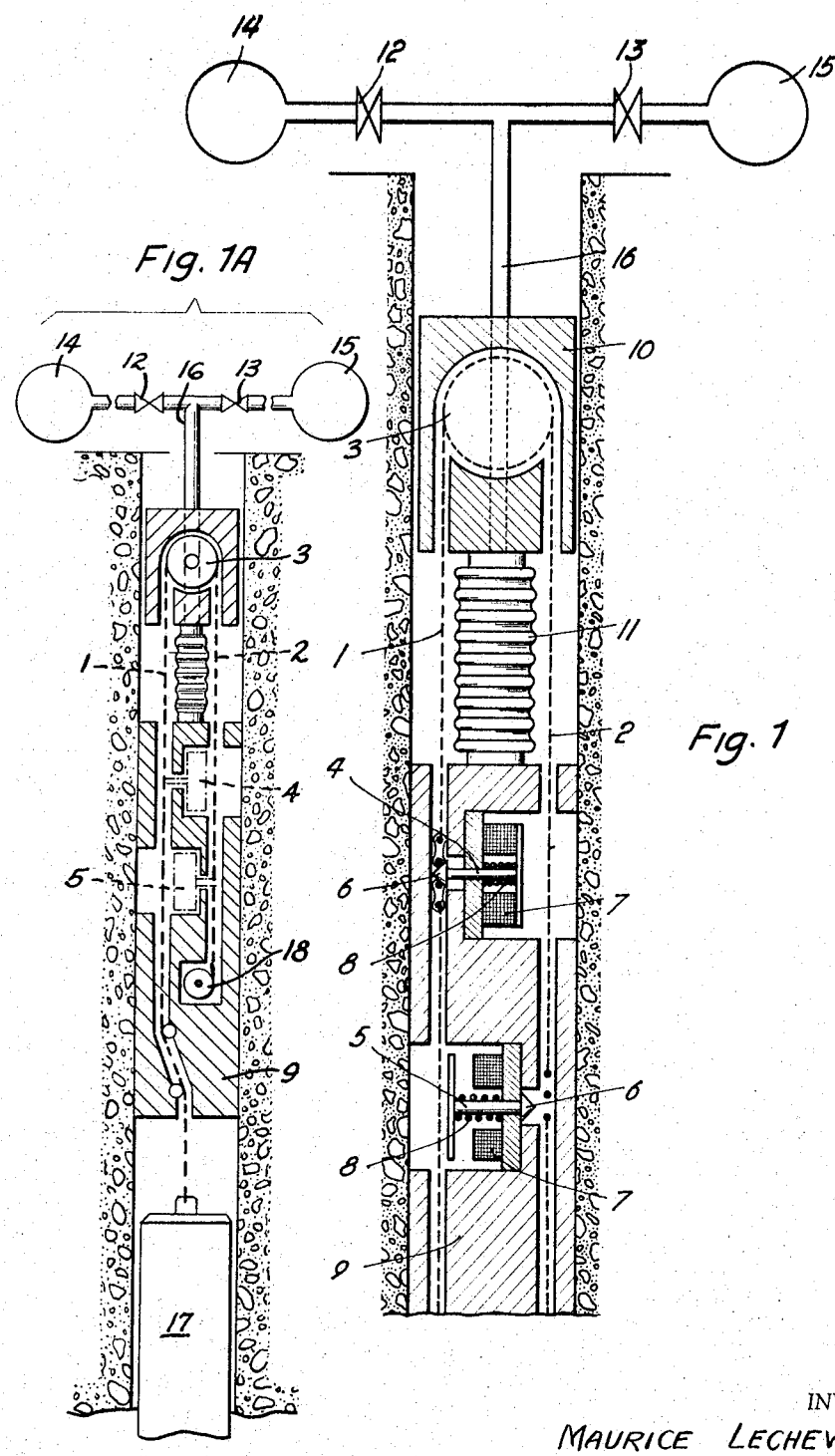
FIG. 1 is a diagrammatic view in sectional elevation of the drive mechanism in accordance with the invention.

The particular example of construction of the drive mechanism in accordance with the invention as illustrated in FIG. 1 is a chain hoist which is designed to effect a step-by-step displacement of the control rod considered. The vertical length 1 of the chain is attached in any known manner to the control rod 17 and passes over a guide-wheel 3 so as to form a downcoming vertical length 2 which terminates in a stationary storage device 18 of any known type.

Two locking devices 4, 5 co-operate respectively with the vertical lengths 1, 2 of the chain. In the particular example which is illustrated in the drawings, said locking devices are identical and constituted by a stud 6, an electromagnet 7 and a spring 8 which opposes the action of said electromagnet. The locking position is obtained by energizing the electromagnet 7 (position of the locking-bolt 4 in FIG. 1), whilst the releasing operation is carried out simply by the withdrawal of the bolt under the action of spring 8 when the electromagnet 7 is de-energized (position of the locking-bolt 5 in FIG. 1). The locking device 4, 5 is mounted in a frame 9. In the example which is illustrated, the frame 9 is stationary and is in fact anchored in the reactor biological shield structure (not shown in the drawings).

The guide-wheel 3 is mounted as a fixed pulley inside a body 10 which is movable relatively to the frame 9. More exactly, the body 10 slides vertically in translational motion relatively to the frame 9. The movement of the body 10 is effected by a pneumatic system comprising a bellows 11 which is preferably fabricated of stainless steel, the variable height of which is controlled by the pressure which is supplied through a conduit 16 from a high-pressure feed tank 14 and a low-pressure feed-tank 15, said tanks being respectively fitted with regulator valves 12, 13.

When the control rod considered is required to remain stationary, the two lengths 1 and 2 of the chain are locked in position at the same time by the bolts 4 and 5.

In accordance with the invention, the vertical movements of the control rod are carried out by controlling the displacement of the body 10 relatively to the stationary frame 9 in conjunction with the actuation of the locking-bolts 4 and 5. There have been indicated in FIGS. 2 and 3 respectively the four-stage cycles $abcd$, $a'b'c'd'$ which are produced by means of the hoist in accordance with the invention for the upward and downward movements of a control rod, the coarse-control or shim operation being also carried out in a similar manner but at different rod-displacement speeds.

Figure 2:
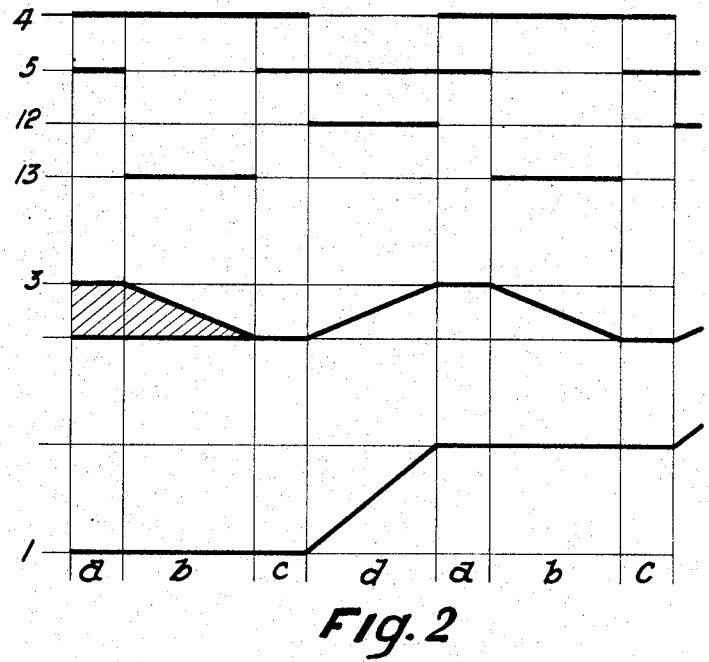
FIG. 2 is a diagram which is intended to define the movements or functions of the different members which constitute the drive mechanism for the purpose of controlling the upward movement of a control rod.
Figure 3:
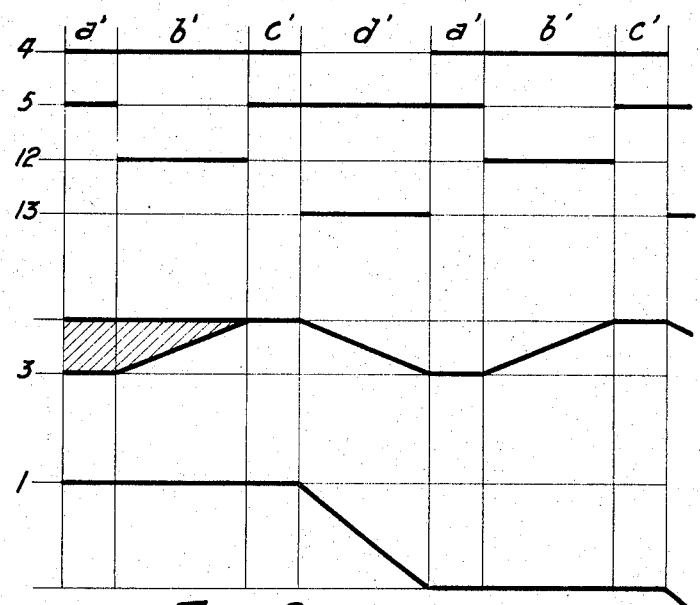
FIG. 3 is a diagram which is similar to that of FIG. 2 but in the case of a downward movement of the control rod within the reactor core.

In FIGS. 2 and 3 respectively, the four stages of the cycle have been represented by the four consecutive columns $abcd$, $a'b'c'd'$. In the diagrams, there have been indicated in thick lines successively from the top:

The times of closure of the locking-bolts 4 and 5;

The times of opening of the valves 12 and 13;

The corresponding displacement of the guide-pulley 3;

The displacement of the length 1 of the chain, or in other words the stroke of the control rod.

As can be seen from FIGS. 2 and 3, the position of the guide-pulley 3 is indeterminate during the three preliminary stages $a_0$, $b_0$, $c_0$–$a'_0$, $b'_0$, $c'_0$ and in fact depends on the pressure which prevails within the bellows 11 but since the locking-bolt 4 is closed, the control rod remains stationary. During the fourth stage, the locking-bolt 4 is opened at the same time as either one or the other of the valves 12 and 13 and the displacement of the pulley 3 is accompanied by the displacement of side 1 of the chain and the resulting displacement of the control rod which accordingly progresses (upward motion $d$ in FIG. 2, downward motion $d'$ in FIG. 3) by a distance which corresponds to the length of either one or a number of links of the chain.

During the following cycle, the initial period of stages $a_0$, $b_0$ and $c_0$ is suppressed but is replaced by a period of return of the pulley 3 to its initial position (downward motion $b$ in FIG. 2 and upward motion $b'$ in FIG. 3). During this stage $b$, $b'$, the locking-bolt 4 is closed and the control rod remains motionless, but the locking-bolt 5 is released in such manner that side 2 of chain 1 is capable of displacement and that the tension of said chain remains constant.

The stages $a$ and $c$, $a'$ and $c'$ correspond to the period of time which elapses between the closure of valve 12 and the opening of valve 13 and conversely.

At the end of time stage $b$ or $b'$, the device has reverted to the starting position and is ready for a further displacement of the control rod as represented in the diagram by an upward movement $d$ or downward movement $d'$. The said control rod thus moves in step-by-step progression by a few chain-links per cycle.

It would also be an easy matter to displace the control rod only over a portion of this distance by regulating in a suitable manner the time of opening of the valve which controls the bellows.

In order to carry out the safety function of the control rod and to permit this latter to reach the reactor core under the action of its own weight, it is merely necessary to cut off the current supply to the two electromagnets 8 so as to release the two locking-bolts 4 and 5.

In accordance with the invention, it is also possible to effect the relative displacement of the body 10 and of the frame 9 if said body 10 (and consequently the guide-pulley 3 which forms a part thereof) is stationary, whilst the frame 9 is movable in vertical translation and endowed with a reciprocating motion under the action of the pressure which prevails within the bellows 11. In this arrangement, the frequency of the step-by-step movement is doubled whereas its amplitude is reduced by half and the effort which is exerted on the bellows is divided in two.

It would not constitute any departure from the scope of the present invention to devise alternative forms of the mechanism as hereinabove described. In particular, it would be possible to choose any type of attachment means other than a chain, any suitable type of locking device, any suitable drive means (hydraulic, mechanical, electrical, etc.). The invention is in fact not limited in any respect whatever to the form of embodiment as hereinbefore described and is intended to include within its scope any system which entails the application thereof.

What I claim is:

1. A drive mechanism for a nuclear reactor control rod, comprising: a guiding device; a frame, one of said guilding device and said frame being fixed and the other thereof being movable with respect thereto; a control rod disposed below said guiding device and said frame; a control rod suspension member passing over said guiding device and having one end thereof secured to said control rod, the other end of said suspension member being attached to said frame; a first securing means operable for locking said suspension member in pisition, located between said guiding device and said control rod; a second securing means operable for locking said suspension member, located between said guiding device and said other end of said suspension member, both said first and said second securing means being mounted on said frame, said control rod being locked in position when both of said securing means are locked and being free to drop when both of said securing means are released; and means for producing and controlling relative displacement between said quiding device and said frame, operable to displace said guiding device in one direction relative to said frame when said first securing means is released and said second securing means is locked to thereby move said control rod, and operable to displace said guiding device in the opposite direction relative to said frame when said first securing means is locked and said second securing means is released, said means for producing and controlling relative displacement including: a bellows connected between said guiding device and said frame; and a pneumatic control system connected with said bellows.

2. A drive mechanism is recited in claim 1, wherein said guide device includes a pulley, and wherein said suspenson member comprises a chain which passes over said pulley.

3. A drive mechanism as recited in claim 1, wherein said frame is stationary and said guiding device is movable with respect thereto.

4. A drive mechanism for a nuclear reactor control rod, comprising: a guiding device, including a pulley; a frame, one of said guiding device and said frame being fixed and the other thereof being movable with respect thereto; a control rod disposed below said guiding device and said frame; a control rod suspension member comprising a chain, said chain passing over said pulley of said guiding device and having one end thereof secured to said control rod, the other end of said chain being attached to said frame; a first securing means operable for locking said chain in position, located between said guiding device and said control rod; a second securing means operable for locking said chain, located between said guiding device and said other end of said chain, both said first and said second securing means being mounted on said frame, said control rod being locked in position when both of said securing means are locked and being free to drop when both of said securing means are released, each of said securing means including: a stud mounted on said frame for movement toward and away from said chain; an electromagnet associated with said stud, and operable when energized to move said stud toward said chain for clamping engagement therewith; and means for returning said stud to a disengaged position when said electromagnet is deenergized; and means for producing and controlling relative displacement between said guiding device and said frame, operable to displace said guiding device in one direction relative to said frame when said first securing means is released and said second securing means is locked to thereby move said control rod, and operable to displace said guiding device in the opposite direction relative to said frame when said first securing means is locked and said second securing means is released.

5. A drive mechanism for a nuclear reactor control rod, comprising: a guiding device; a frame, said guiding device being stationary and said frame being movable with respect thereto; a control rod disposed below said guiding device and said frame; a control rod suspension member passing over said guiding device and having one end thereof secured to said control rod, the other end of said suspension member being attached to said frame; a first securing means operable for locking said suspension member in position, located between said guiding device and said control rod; a second securing means operable for locking said suspension member, located between said guiding device and said other end of said suspension member, both said first and said second securing means being mounted on said frame, said control rod being locked in position when both of said securing means are locked and being free to drop when both of said securing means are released; and means for producing and controlling relative displacement between said guiding device and said frame, operable to displace said frame in one direction relative to said guiding device when said first securing means is released and said second securing means is locked to thereby move said control rod, and operable to displace said frame in the opposite direction relative to said guiding device when said first securing means is locked and said second securing means is released.

References Cited

UNITED STATES PATENTS

| | | | |
|---|---|---|---|
| 293,657 | 2/1894 | Lucas | 144—200 |
| 1,810,680 | 6/1931 | Rothgarn | 254—93 |
| 2,560,732 | 11/1958 | Snow | 188—65.1 |
| 2,973,566 | 3/1961 | Elsner | 254—93 |
| 3,175,720 | 3/1965 | Millot et al. | 214—658 |

FOREIGN PATENTS

| | | |
|---|---|---|
| 859,811 | 1/1961 | Great Britain. |
| 921,660 | 3/1963 | Great Britain. |

FRED C. MATTERN, Jr., *Primary Examiner.*

DAVID J. WILLIAMOWSKY, *Examiner.*

F. E. BAKER, W. S. RATLIFF, *Assistant Examiners.*